United States Patent
Tsai et al.

(10) Patent No.: US 11,689,267 B2
(45) Date of Patent: Jun. 27, 2023

(54) APERIODIC CSI TRIGGERING IN SCENARIOS WITH MULTIPLE PDCCHS

(71) Applicant: Mediatek Inc., Hsinchu (TW)

(72) Inventors: Lung-Sheng Tsai, Hsinchu (TW); Weidong Yang, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 262 days.

(21) Appl. No.: 16/861,675

(22) Filed: Apr. 29, 2020

(65) Prior Publication Data
US 2020/0350968 A1 Nov. 5, 2020

Related U.S. Application Data

(60) Provisional application No. 62/870,721, filed on Jul. 4, 2019, provisional application No. 62/852,368, filed
(Continued)

(51) Int. Cl.
*H04B 7/06* (2006.01)
*H04W 24/10* (2009.01)
(Continued)

(52) U.S. Cl.
CPC ......... *H04B 7/0626* (2013.01); *H04L 1/0026* (2013.01); *H04L 5/0057* (2013.01); *H04W 24/10* (2013.01); *H04W 72/23* (2023.01)

(58) Field of Classification Search
CPC ... H04B 7/0626; H04L 1/0026; H04L 5/0057; H04L 1/0023; H04L 5/0055;
(Continued)

(56) References Cited

U.S. PATENT DOCUMENTS 10,931,354 B2 * 2/2021 Tsai ............... H04B 7/0626
11,356,162 B2 * 6/2022 Tsai ............... H04B 7/024
(Continued)

FOREIGN PATENT DOCUMENTS

CN 102291223 A 12/2011
CN 104620627 A 5/2015
(Continued)

OTHER PUBLICATIONS

Taiwan Patent Office, "Office Action", dated Jan. 29, 2021. Taiwan.
(Continued)

*Primary Examiner* — Walli Z Butt
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a UE. The UE monitors a respective down link control channel (DCCH) from each of a plurality of transmission and reception points (TRPs). The UE receives, from a first TRP of the plurality of TRPs, a first trigger for reporting N1 channel state information (CSI) reports within a time duration, N1 being an integer greater than 0. The UE commits to update the N1 CSI reports. The UE determines that P processing units are remaining available for calculation of CSI reports while the UE is calculating the N1 CSI reports. P is a number greater than or equal to zero. Each of the P processing units indicates a predetermined amount of computing power of the UE.

18 Claims, 10 Drawing Sheets

Related U.S. Application Data on May 24, 2019, provisional application No. 62/842,642, filed on May 3, 2019.

(51) Int. Cl.
*H04L 5/00* (2006.01)
*H04L 1/00* (2006.01)
*H04W 72/23* (2023.01)

(58) Field of Classification Search
CPC .... H04L 1/1812; H04L 1/1854; H04W 24/10; H04W 72/042; H04W 72/23
See application file for complete search history.

(56) References Cited

U.S. PATENT DOCUMENTS

| | | | |
|---|---|---|---|
| 2013/0114455 A1* | 5/2013 | Yoo | H04W 72/082 370/252 |
| 2013/0148611 A1 | 6/2013 | Moulsley et al. | |
| 2016/0112892 A1 | 4/2016 | Damnjanovic et al. | |
| 2016/0338041 A1 | 11/2016 | Li et al. | |
| 2017/0070331 A1 | 3/2017 | Hoshino et al. | |
| 2019/0053084 A1 | 2/2019 | Hosseini et al. | |
| 2019/0053089 A1 | 2/2019 | Kwak et al. | |
| 2019/0124539 A1 | 4/2019 | Kim et al. | |
| 2019/0297519 A1* | 9/2019 | Han | H04L 5/0032 |
| 2020/0092070 A1* | 3/2020 | Wu | H04L 5/0007 |
| 2020/0154466 A1* | 5/2020 | John Wilson | H04L 5/0055 |
| 2020/0314677 A1* | 10/2020 | Kim | H04W 72/14 |
| 2020/0374084 A1* | 11/2020 | Yuan | H04L 1/0026 |
| 2021/0007067 A1* | 1/2021 | Tang | H04W 76/11 |
| 2021/0127387 A1* | 4/2021 | Huang | H04L 5/001 |
| 2021/0167829 A1* | 6/2021 | Li | H04B 7/024 |
| 2022/0079768 A1* | 3/2022 | Hotchkiss | A61F 2/4241 |

FOREIGN PATENT DOCUMENTS

| | | | |
|---|---|---|---|
| CN | 105122680 A | 12/2015 | |
| CN | 107431515 A | 12/2017 | |
| WO | 2017078826 A1 | 5/2017 | |
| WO | WO-2020198645 A1 * | 10/2020 | ........... H04L 5/0044 |

OTHER PUBLICATIONS

PCT International Search Report, PCT/CN2020/091792, dated Jul. 30, 2020.

3GPP TSG RAN WG1 Meeting #92bis, R1-1804973, Sanya, China, Apr. 16-20, 2018.

3GPP TSG RAN WG1 Meeting #94bis, R1-1811982, Chengdu, China, Oct. 8-12, 2018.

PCT International Search Report, PCT/CN2020/088419, dated Aug. 11, 2020.

3GPP TSG RAN WG1 Meeting #70, R1-123365, Qingdao, China, Aug. 13-17, 2012.

3GPP TSG-RAN WG1 Meeting #70, R1-123578, Qingdao, China, Aug. 13-17, 2012.

* cited by examiner

APERIODIC CSI TRIGGERING IN SCENARIOS WITH MULTIPLE PDCCHS

CROSS-REFERENCE TO RELATED APPLICATION(S)

This application claims the benefits of U.S. Provisional Application Ser. No. 62/842,642, entitled "METHODS FOR ARRANGING CSI PROCESSING UNITS WITH MULTIPLE TRANSMISSION POINTS" and filed on May 3, 2019, U.S. Provisional Application Ser. No. 62/852,368, entitled "CSI REPORTING FOR MULTIPLE TRANSMISSION POINTS" and filed on May 24, 2019, and U.S. Provisional Application Ser. No. 62/870,721, entitled "APERIODIC CSI TRIGGERING IN SCENARIOS WITH MULTIPLE PDCCHS" and filed on Jul. 4, 2019, all of which are expressly incorporated by reference herein in their entirety.

BACKGROUND

Field

The present disclosure relates generally to communication systems, and more particularly, to techniques of simultaneously reporting multiple channel state information (CSI) reports by a user equipment (UE) having limited capability to multiple transmission and reception points (TRPs).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE monitors a respective down link control channel (DCCH) from each of a plurality of transmission and reception points (TRPs). The UE receives, from a first TRP of the plurality of TRPs, a first trigger for reporting N1 channel state information (CSI) reports within a time duration, N1 being an integer greater than 0. The UE commits to update the N1 CSI reports. The UE determines that P processing units are remaining available for calculation of CSI reports while the UE is calculating the N1 CSI reports. P is a number greater than or equal to zero. Each of the P processing units indicates a predetermined amount of computing power of the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
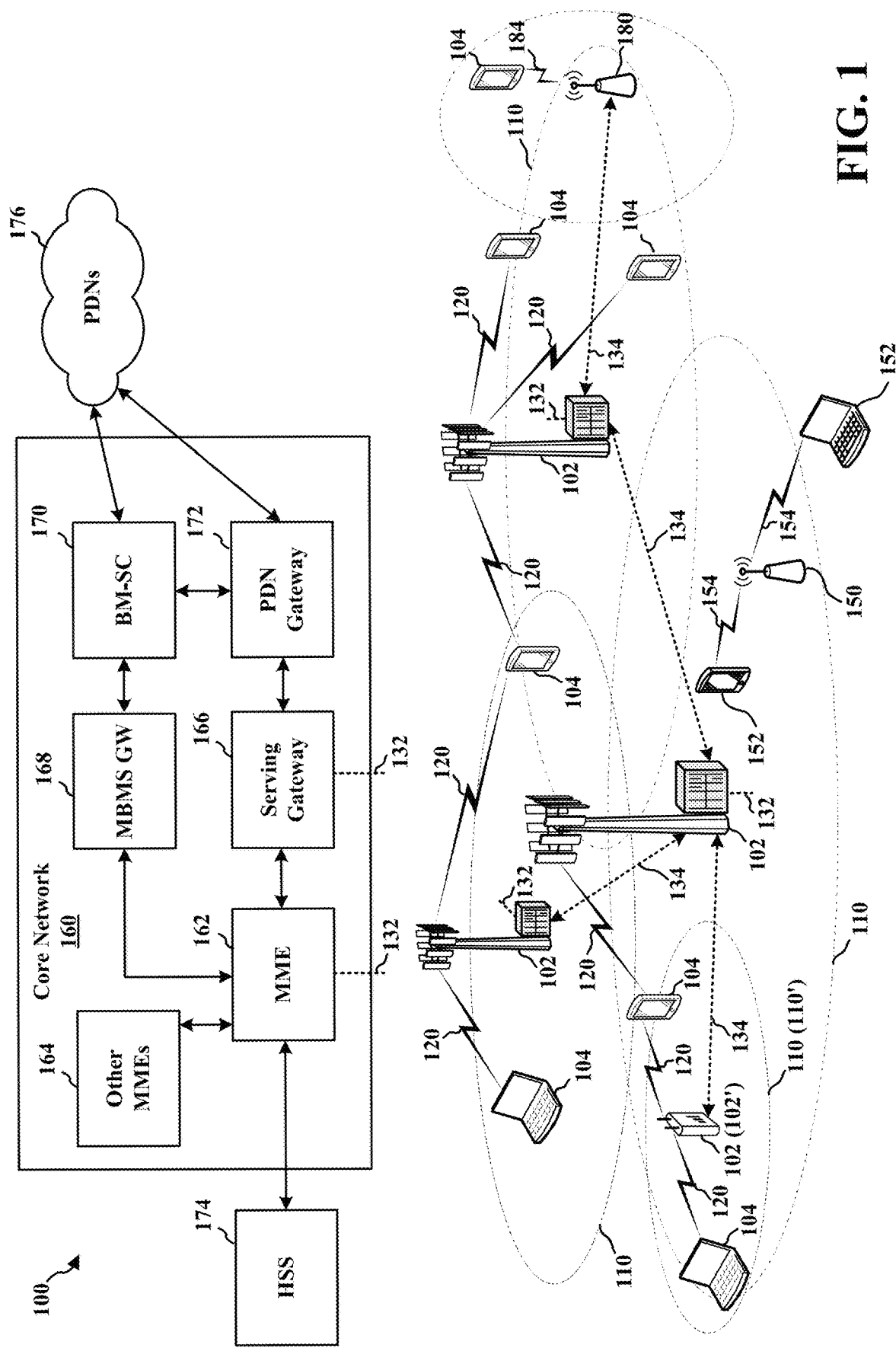
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
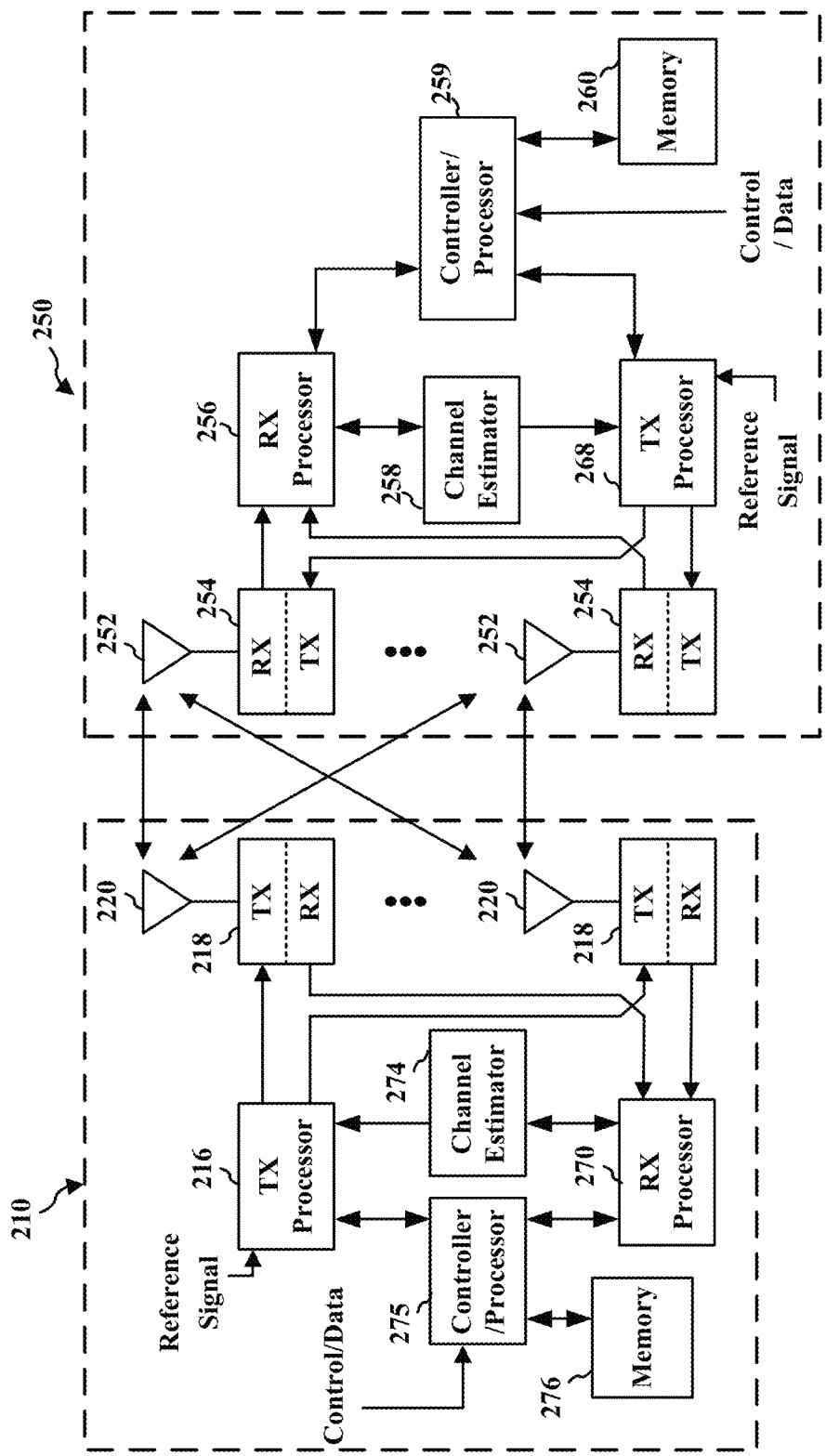
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
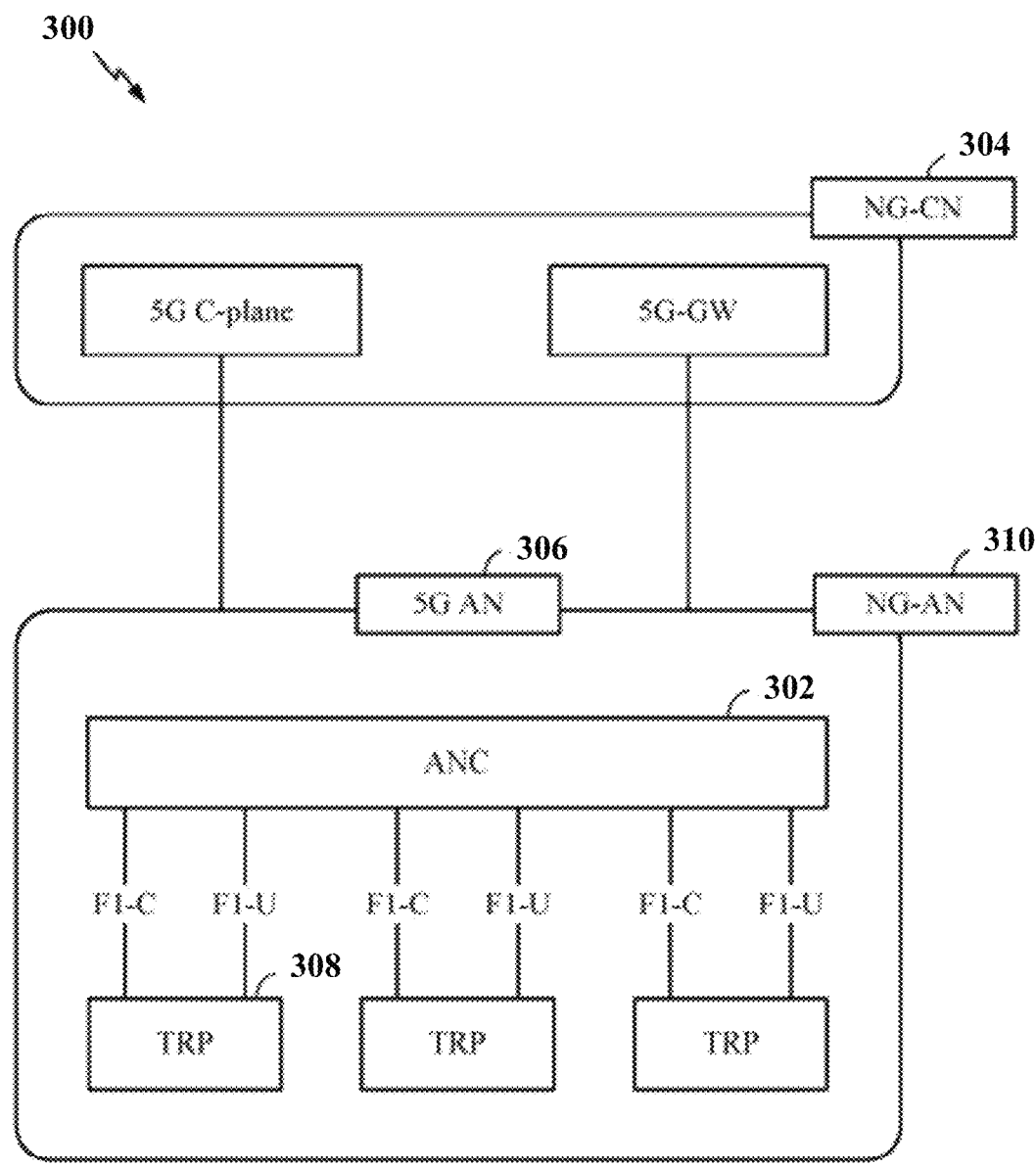
FIG. 3 illustrates an example logical architecture of a distributed access network.

FIG. 3 illustrates an example logical architecture 300 of a distributed RAN, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
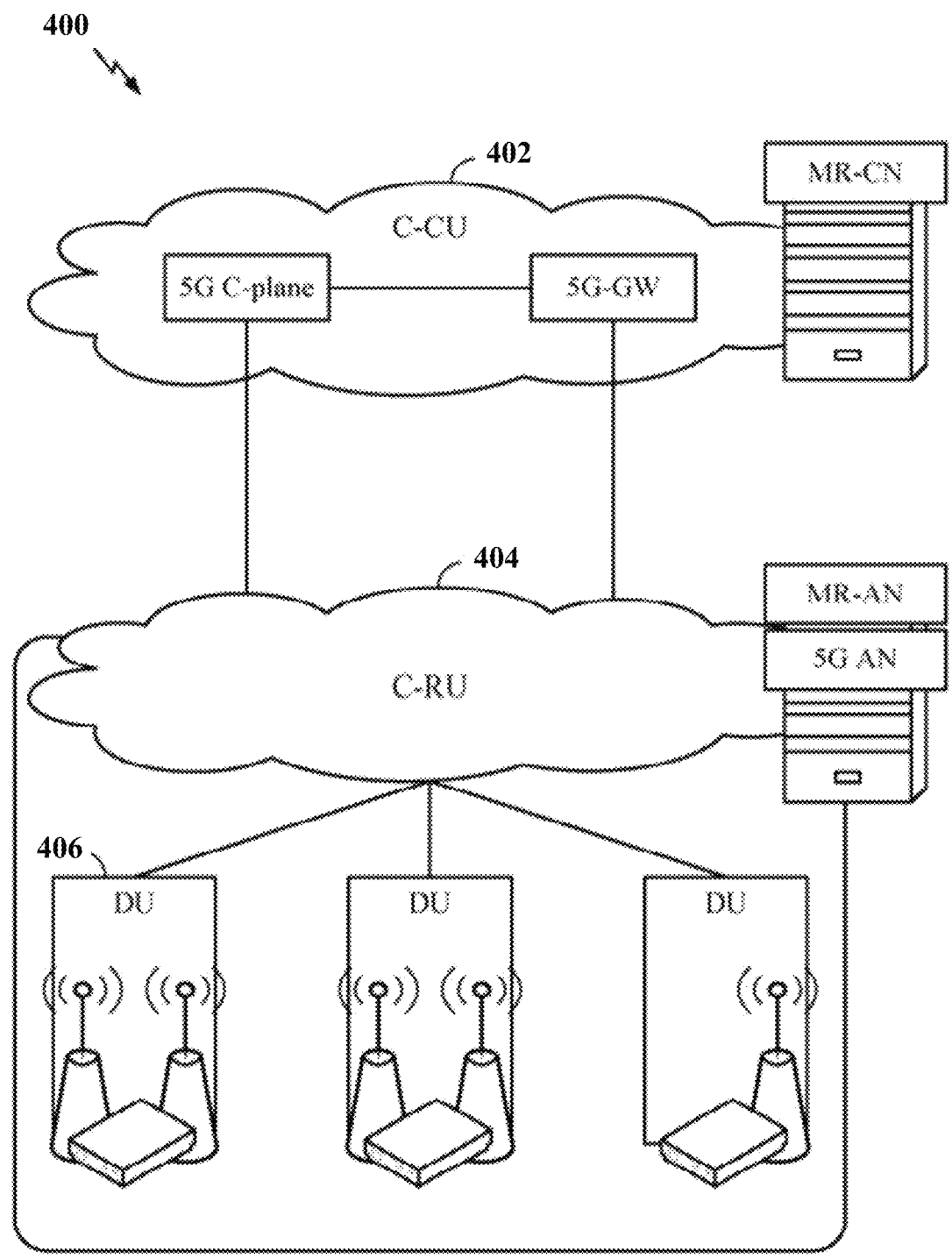
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
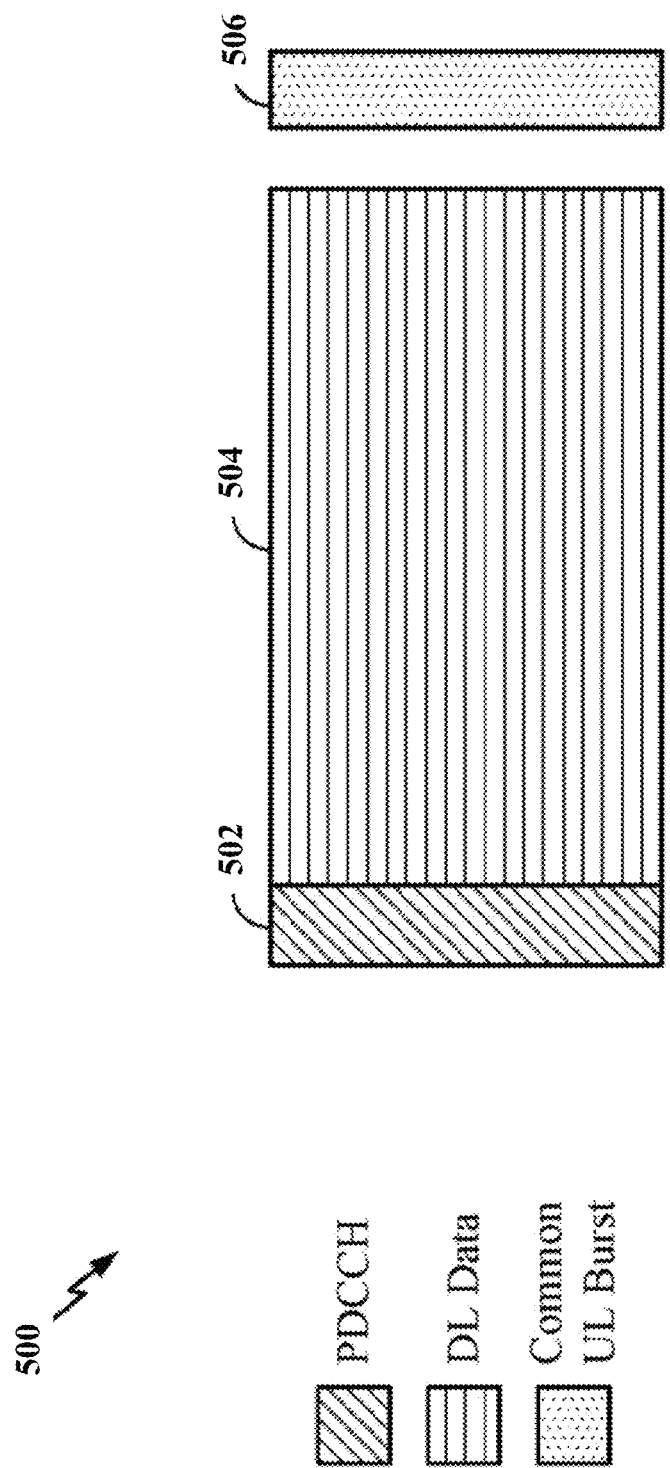
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
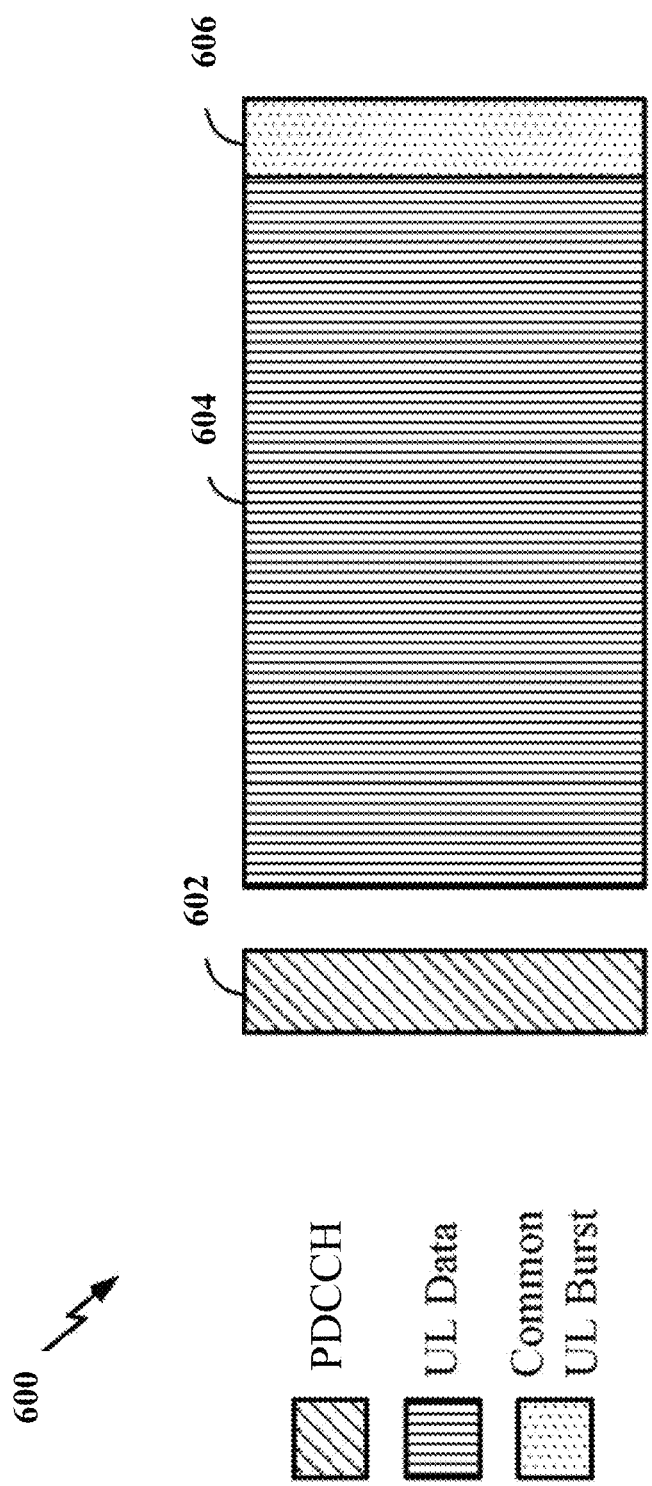
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Channel state information (CSI) reports provide the network with information about the current channel conditions. CSI usually comprises one or more pieces of information: rank indicator (RI), precoder matrix indicator (PMI), channel-quality indicator (CQI), Reference Signal Received Power (RSRP), and channel state information reference signal (CSI-RS) resource indicator (CRI).

In the present disclosure, one or more terms or features are defined or described in "3GPP TS 38.214 V15.5.0 (2019-03) Technical Specification; 3rd Generation Partnership Project; Technical Specification Group Radio Access Network; NR; Physical layer procedures for data (Release 15)" (3GPP TS 38.214), which is expressly incorporated by reference herein in its entirety. Those terms and features are known by a person having ordinary skill in the art.

Figure 7:
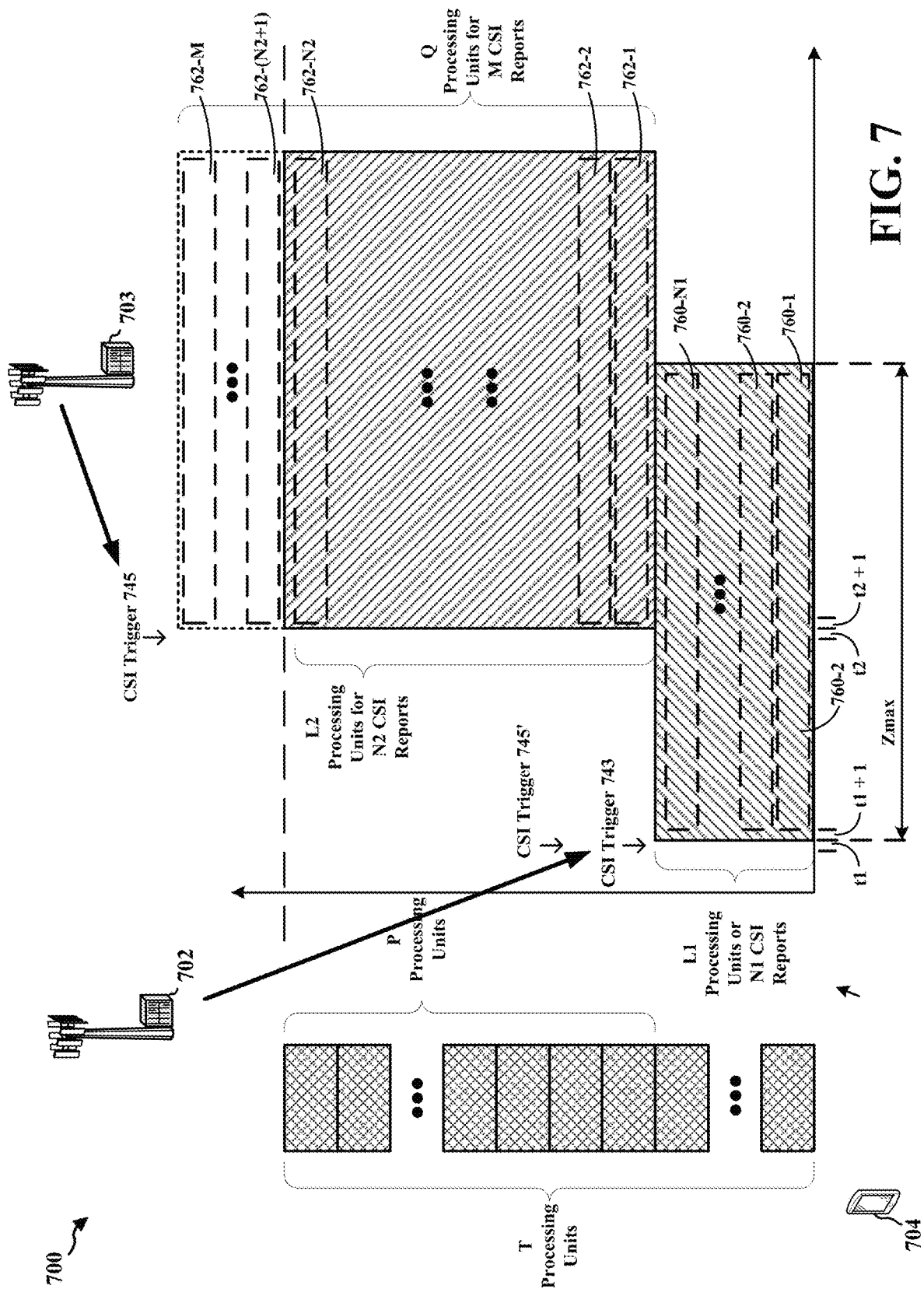
FIG. 7 is a diagram illustrating calculation of CSI reports by a UE.

FIG. 7 is a diagram 700 illustrating calculation of CSI reports by a UE 704. The UE 704 is configured to communicate signaling and data with multiple transmission and reception points (TRPs), concurrently. In particular, the UE 704 can receive respective PDCCHs from the multiple TRPs, concurrently. In this example, only a TRP 702 and a TRP 703 are shown in FIG. 7, and the other TRPs are not shown.

The UE 704 may need to update CSI reports to the TRP 702, the TRP 703, and the other TRPs. The techniques described infra use the TRP 702 and the TRP 703 as an example, and can be similarly applied to the other TRPs.

The UE 704 has a limited amount of computing power for calculation of CSI reports. A processing unit may be used to indicate a predetermined amount of computing power of the UE 704. For example, based on the hardware configuration of the UE 704, the UE 704 may be set up with total T processing units for calculation of CSI reports. In certain configurations, the UE 704 may send messages to the TRP 702 and/or the TRP 703 indicating that the UE 704 possesses total T processing units for calculation of CSI reports.

In certain circumstances, the backhaul among the multiple TRPs are not ideal, and communication delays are expected among the TRPs. In this example, the TRP 702 and the TRP 703 do not know how many processing units of the UE 704 are already occupied, especially for updating CSI reports triggered by aperiodic-CSI (A-CSI) trigger(s) sent by another TRP. As a result, some of CSI reports triggered by a CSI trigger may not be updated at the UE 704. The network side (including either or both of the TRP 702 and the TRP 703) may not know exactly which reports are not updated, as neither one of the TRP 702 and the TRP 703 know how many remaining processing units are available after a potential CSI trigger from another TRP is received at the UE 704. On the other hand, the CSI processing parameters (Z, Z') as defined in 3GPP TS 38.214 may not be known by both the TRP 702 and the TRP 703. For example, the processing units associated with CSI reports triggered by the TRP 702 and committed to be updated may not be known by the TRP 703.

In a first technique, if the UE 704 received a respective trigger from each of the TRP 702 and the TRP 703 in the same particular slot for updating certain CSI reports, the UE 704 may be configured to ignore the triggers and may refrain from updating any CSI reports triggered by those triggers.

In a second technique, the UE 704 may be configured to only respond to triggers from a particular TRP. In one example, the particular TRP may be the TRP 702. Therefore, the UE 704 only updates the CSI reports triggered by the TRP 702 and ignores CSI triggers from the TRP 703 with no reporting.

In a third technique, in a given slot, the UE 704 may be configured to only respond to triggers from a particular TRP. The UE 704 can be configured through signaling regarding the TRP to respond in the given slot. In one example, the UE 704 may be configured to respond to triggers from the TRP 702 in a first slot while to respond to triggers from the TRP 703 in a second slot. The UE 704 updates the CSI reports accordingly.

In a fourth technique, the UE 704 may report the processing units occupancy status to the TRP 702 and/or the TRP 703. In one example, in an OFDM symbol t1 of a first slot, the UE 704 receives a CSI trigger 743 for updating N1 CSI reports 760-1 to 760-N1 and sending the CSI reports 760-1 to 760-N1 to the TRP 702. Further, the UE 704 can determine a cost value (e.g., a number of processing units) assigned to each of the CSI reports 760-1 to 760-N1. As such, the UE 704 can estimate the amount of computing power or the number of processing units required for calculation of each CSI report.

Further, the UE 704 can assign a cost value to a particular CSI report based on the complexity of the particular CSI report and subcarrier spacing of the carrier used to transmit the particular CSI report. As such, using the cost value of each of the CSI reports 760-1 to 760-N1, the UE 704 can determine that L1 processing units are required to calculate the CSI reports 760-1 to 760-N1. In this example, in the OFDM symbol (t1+1), which is in the first slot, the UE 704 is not calculating any previously triggered CSI report. Thus, the UE 704 has all T processing units. In a first configuration, the UE 704 may report to the TRP 702 and/or the TRP 703 that all processing units (e.g., T processing units) are available at the UE 704.

Further, the UE 704 determines that T is larger than L1 and that L1 processing units can be allocated to the calculation of the CSI reports 760-1 to 760-N1. As such, the UE 704 commits to update the CSI reports 760-1 to 760-N1. In a second configuration, the UE 704 may report the number of CSI reports (e.g., N1 CSI reports) committed to be updated after receiving a CSI trigger on a PDCCH from the TRP 702.

Further, as described supra, the UE 704 determines that the maximum processing time period $Z_{max}$ is required for calculating the CSI reports 760-1 to 760-N1. Therefore, the UE 704 allocates L1 processing units throughout the $Z_{max}$ time period starting from the OFDM symbol (t1+1) for calculating the CSI reports 760-1 to 760-N1. Accordingly, the UE 704 determines that L1 processing units are occupied and P processing units are available for calculation of additional CSI reports throughout the $Z_{max}$ time period starting from the OFDM symbol (t1+1), P being T minus L1. In the first configuration, the UE 704 may now report to the TRP 702 and/or the TRP 703 that not all processing units (e.g., T processing units) are available at the UE 704. In a third configuration, the UE 704 may report the number of unoccupied processing units (e.g., P processing units) to the TRP 702 and/or the TRP 703. In certain circumstances, the remaining number of unoccupied processing units may be 0.

In the first, second, and third configurations described supra, the UE 704 may attach a report indicating the processing units occupation status to CSI reports on a PUSCH/PUCCH.

Further, in this example, in an OFDM symbol t2 of a second slot, the UE 704 receives another CSI trigger 745 from the TRP 703. The CSI trigger 745 requests the UE 704 to update M CSI reports to the TRP 702. As described supra, each of the M CSI reports is assigned a cost value. Thus, the UE 704 can determine that total Q processing units are required for calculation of the M CSI reports.

As the OFDM symbol (t2+1) is within the $Z_{max}$ time period, the UE 704 is using L1 processing units to calculate the N1 CSI reports 760-1 to 760-N1 in the OFDM symbol (t2+1). Therefore, the UE 704 determines that L1 processing units are occupied and P processing units are available for calculation of CSI reports, P being T minus L1. In this example, the UE 704 determines that Q processing units required are greater than the P processing units available. Accordingly, the UE 704 determines that the UE 704 does not have the capability to calculate all M CSI reports in the OFDM symbol (t2+1).

In certain scenarios, t1 equals t2. Accordingly, the UE 704 may use priority levels between the two triggers to identify reports associated with which CSI trigger have priorities.

In one technique, the UE 704 may select N2 CSI reports 762-1 to 762-N2 from the M CSI reports being triggered, N2 being a maximum integer that allows total L2 processing units assigned for calculation of the N2 CSI reports to be smaller than or equal to the P processing units. Further, each of the N2 CSI reports may be required to have a priority level higher than that of any of the others of the M CSI reports. In one example, the priority level of a report may be assigned based on information carried in that report and/or a report ID of that report. In another example, the M CSI reports may be assigned priority levels in a descending order according to an ascending order of the cost values of the M CSI reports. That is, the lower cost value a CSI report has, the higher priority level that CSI report has. In another example, the M CSI reports may be assigned priority levels in a descending order according to an ascending order of the report IDs of the M CSI reports. That is, the lower report ID a CSI report has, the higher priority level that CSI report has. As such, the UE 704 calculates the N2 CSI reports having the highest priority levels of the M CSI reports starting from the OFDM symbol (t2+1).

As described supra, the UE 704 does not have the capability to update the remaining CSI reports 762-(N2+1) to 762-M. In one configuration, UE 704 may use previous updated corresponding reports, which may be outdated, as current uncalculated CSI reports 762-(N2+1) to 762-M. In another configuration, the UE 704 may generate the remaining CSI reports 762-(N2+1) to 762-M with dummy information. As those reports are not updated or calculated, the UE 704 may send a signaling to the TRP 703 to indicate that the remaining CSI reports 762-(N2+1) to 762-M are not updated by the UE. Subsequently, the UE 704 sends the CSI reports 762-1 to 762-N2 and the uncalculated CSI reports 762-(N2+1) to 762-M to the TRP 703, as requested.

In yet another configuration, the UE 704 can generate uncalculated CSI reports 762-(N2+1) to 762-M that do not have any relationship with any previously calculated CSIs in the CSI report. While the uncalculated CSI reports 762-(N2+1) to 762-M may carry valid entries such as rank indication (RI), Channel Quality Indicator (CQI), Pre-coding Matrix Indicator (PMI), CSI-RS Resource Indicator (CRI), Reference Signal Received Power (RSRP), Layer Indicator (LI), etc., those entries may not bear relevance to the current channel state or the channel state of a previous occasion. Furthermore, the uncalculated CSI reports 762-(N2+1) to 762-M may contain predefined sequence for Uplink Control Information (UCI) bits representing CSI such as "000 . . . 000", "111 . . . 1111", or some patterns corresponding to illegal combinations of CSI components. Upon detecting one or more of those patterns, the network can determine that the uncalculated CSI reports 762-(N2+1) to 762-M are not updated reports. For example, a CSI report with UCI bits corresponding to RI=2 (or RI>2) and CQI=0 is unlikely to happen. In this way, the network is also capable to determine that a report is uncalculated by checking the validity of the reported UCI bits. For the multiple TRP scenarios with non-ideal backhaul, special patterns can be used in CSI reports so that each TRP can identify which CSI reports are really updated without knowing whether remaining processing units are enough for updating triggered CSI reports.

In another example, instead of transmitting the CSI trigger 745 in the second slot, the TRP 703 may transmit a CSI trigger 745' in the first slot, in which the CSI trigger 743 is also transmitted from the TRP 702. Similarly, the CSI trigger 745' requests the UE 704 to update M CSI reports. The UE 704 further determines, based on the processing units required, that the UE 704 does not have the capability to update all the N1 CSI reports triggered by the TRP 702 and the M CSI reports triggered by the TRP 703. CSI reports are associated with a priority value $\text{Pri}_{iCSI}$ (y, k, c, s)=$2 \cdot N_{cells} \cdot M_s \cdot y + N_{cells} \cdot M_s \cdot k + M_s \cdot c + s$, where y=0 for a periodic CSI reports to be carried on PUSCH y=1 for semi-persistent CSI reports to be carried on PUSCH, y=2 for semi-persistent CSI reports to be carried on PUCCH and y=3 for periodic CSI reports to be carried on PUCCH;

k=0 for CSI reports carrying L1-RSRP and k=1 for CSI reports not carrying L1-RSRP;

c is the serving cell index and $N_{cells}$ is the value of the higher layer parameter maxNrofServingCells;

s is the reportConfigID and $M_s$ is the value of the higher layer parameter maxNrofCSI-ReportConfigurations.

A first CSI report is said to have priority over second CSI report if the associated $\text{Pri}_{iCSI}(y,k,c,s)$ value is lower for the first report than for the second report.

For multi-TRP transmission, it is possible that priorities bases on $\text{Pri}_{iCSI}(y,k,c,s)$ value are the same for a CSI report triggered by the TRP 702 and another CSI report triggered by the TRP 703 in a given slot. In one configuration, the UE 704 may further determine priorities of CSI reports triggered by the TRP 702 and the TRP 703 based on respective configuration identifier (e.g., $n_{id}$) received from each of the TRP 702 and the TRP 703 for generating a seed used for deriving a CSI-RS sequence. For example, CSI reports triggered by a TRP that sent a configuration identifier having a lower value to the UE 704 may have a higher priority level. In this example, the $n_{id}$ from the TRP 702 has a value lower than the $n_{id}$ from the TRP 703. Accordingly, the UE 704 determines the CSI reports triggered by the TRP 702 have priorities higher than the CSI reports triggered by the TRP 703. The UE 704 determines to update the N1 CSI reports triggered by the CSI trigger 743 sent from the TRP 702.

In certain configurations, the UE 704 monitors the CSI trigger 743 on a PDCCH transmitted from the TRP 702 on a first group of control resource sets (CORESETs) in the first slot. The UE 704 monitors the CSI trigger 745' on a PDCCH transmitted from the TRP 703 on a second group of CORESETs in the first slot. Further, each CORESET in the first slot is associated with an identifier such as an index for the CORESET grouping. The UE 704 may further determine priorities of CSI reports triggered by the TRP 702 and the TRP 703 based on the indices of the CORESETs that carries the CSI trigger 743 and the CSI trigger 745'. In this example, the index of the CORESET carrying the TRP 702 has a value lower than the index of the CORESET carrying the TRP 703. Accordingly, the UE 704 determines the CSI reports triggered by the TRP 702 have priorities higher than the CSI reports triggered by the TRP 703. The UE 704 updates the N1 CSI reports triggered by the CSI trigger 743 sent from the TRP 702.

As described supra, the UE 704 determines that P processing units are remaining after allocating L1 processing units for updating the N1 CSI reports triggered by the CSI trigger 743. The UE 704 further may select N2 CSI reports from the M CSI reports triggered by the CSI trigger 745' for updating. The remaining (M−N2) CSI reports may be replaced by uncalculated CSI reports. As such, the UE 704 may send the M updated CSI reports to the TRP 702. The UE 704 may send the N2 updated CSI reports and the (M−N2) uncalculated CSI reports to the TRP 703.

In certain configurations, the UE 704 may support Multi-radio access technology (RAT) Dual Connectivity (MR-DC). That is, the UE 704 may connect to two RATs in two different bands. Similar to multi-TRP with non-ideal backhaul, the processing unit cost at one RAT may not be immediately known to another NR-RAT. Thus, the UE 704-1 may receive two CSI trigger DCIs at two NR bands, and each RAT does not know if the remaining available processing units are enough to support updating all triggered CSI reports in the two NR bands. Priority rule among the CSI reports triggered in diffident RAT may be also needed to determine the processing units occupancy order of CSI reports. The techniques described supra directed to multi-TRP scenarios may be directly extended to the multi-RAT scenarios, by treating another RAT as another TRP.

Figure 8:
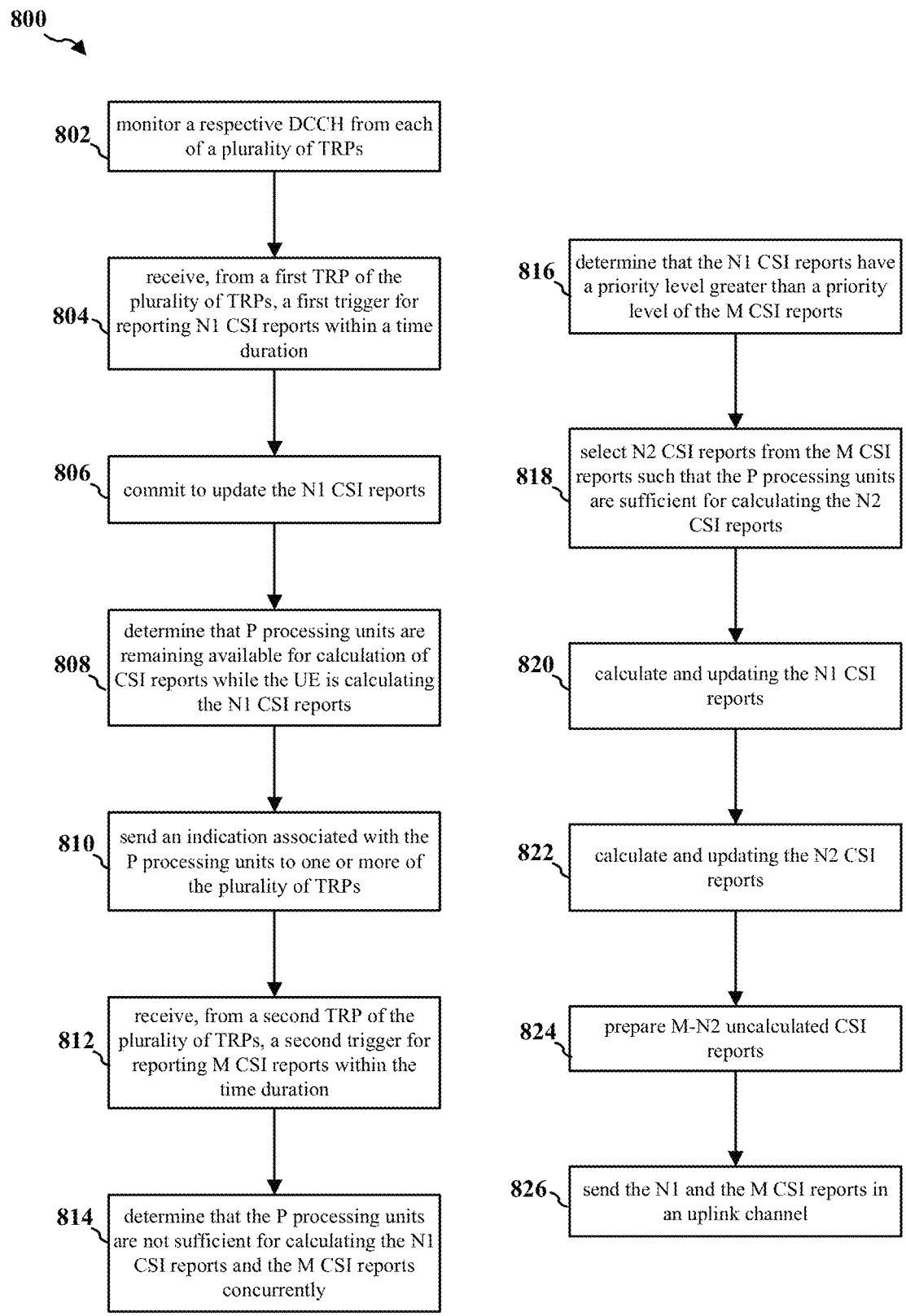
FIG. 8 is a flow chart of a method (process) for updating multiple CSI reports.

FIG. 8 is a flow chart 800 of a method (process) for updating multiple CSI reports. The method may be performed by a UE (e.g., the UE 704, the apparatus 902, and the apparatus 902'). At operation 802, the UE monitors a respective DCCH from each of a plurality of TRPs. At operation 804, the UE receives from a first TRP of the plurality of TRPs, a first trigger for reporting N1 channel state information (CSI) reports within a time duration. N1 is an integer greater than 0.

At operation 808, the UE determines that P processing units are remaining available for calculation of CSI reports while the UE is calculating the N1 CSI reports. P is a number greater than or equal to zero. Each of the P processing units indicates a predetermined amount of computing power of the UE processing.

At operation 810, the UE sends an indication associated with the P processing units to one or more of the plurality of TRPs. The indication may indicate that the P processing units are available at the UE. The indication may indicate that the N1 CSI reports that are committed to be updated.

At operation 812, the UE receives, from a second TRP of the plurality of TRPs, a second trigger for reporting M CSI reports within the time duration. M is an integer greater than 0. At operation 814, the UE determines that the P processing units are not sufficient for calculating the N1 CSI reports and the M CSI reports concurrently. At operation 816, the UE determines that the N1 CSI reports have a priority level greater than a priority level of the M CSI reports. At operation 806, the UE commits to update the N1 CSI reports.

At operation 818, the UE selects N2 CSI reports from the M CSI reports such that the P processing units are sufficient for calculating the N2 CSI reports. N2 is an integer greater than 0 and no more than M. At operation 820, the UE calculates and updates the N1 CSI reports. At operation 822, the UE calculates and updating the N2 CSI reports. At operation 824, the UE prepares (M-N2) uncalculated CSI reports. At operation 826, the UE sends the N1 and the M CSI reports in an uplink channel.

In certain configurations, to prepare the M-N2 uncalculated CSI reports, the UE uses CSI reports calculated previously or dummy CSI reports. In certain configurations, each of the uncalculated (M-N2) CSI reports is represented by a predefined sequence. In certain configurations, the priority levels of the N1 CSI reports and the M CSI reports are determined based on indices identifying the first TRP and the second TRP, respectively. In certain configurations, the UE receives, from the first TRP, a first configuration identifier for generating a seed for deriving channel state information (CSI) reference signals transmitted from the first TRP. The UE receives, from the second TRP, a second configuration identifier for generating a seed for CSI-RSs transmitted from the second TRP. The priority levels of the N1 CSI reports and the M CSI reports are determined based on the first configuration identifier and the second configuration identifier, respectively.

In certain configurations, the respective DCCH from the first TRP is monitored on a first CORESET in a particular slot and associated with a first CORESET identifier. The respective DCCH from the second TRP is monitored on a second CORESET in the particular slot and associated with a second CORESET identifier. The priority levels of the N1 CSI reports and the M CSI reports are determined based on the first CORESET identifier and the second CORESET identifier, respectively.

In certain configurations, the UE communicates with the first TRP using a first radio access technology (RAT). The UE communicates with the second TRP using a second RAT. In certain configurations, the first TRP and the second TRP are the same TRP.

Figure 9:
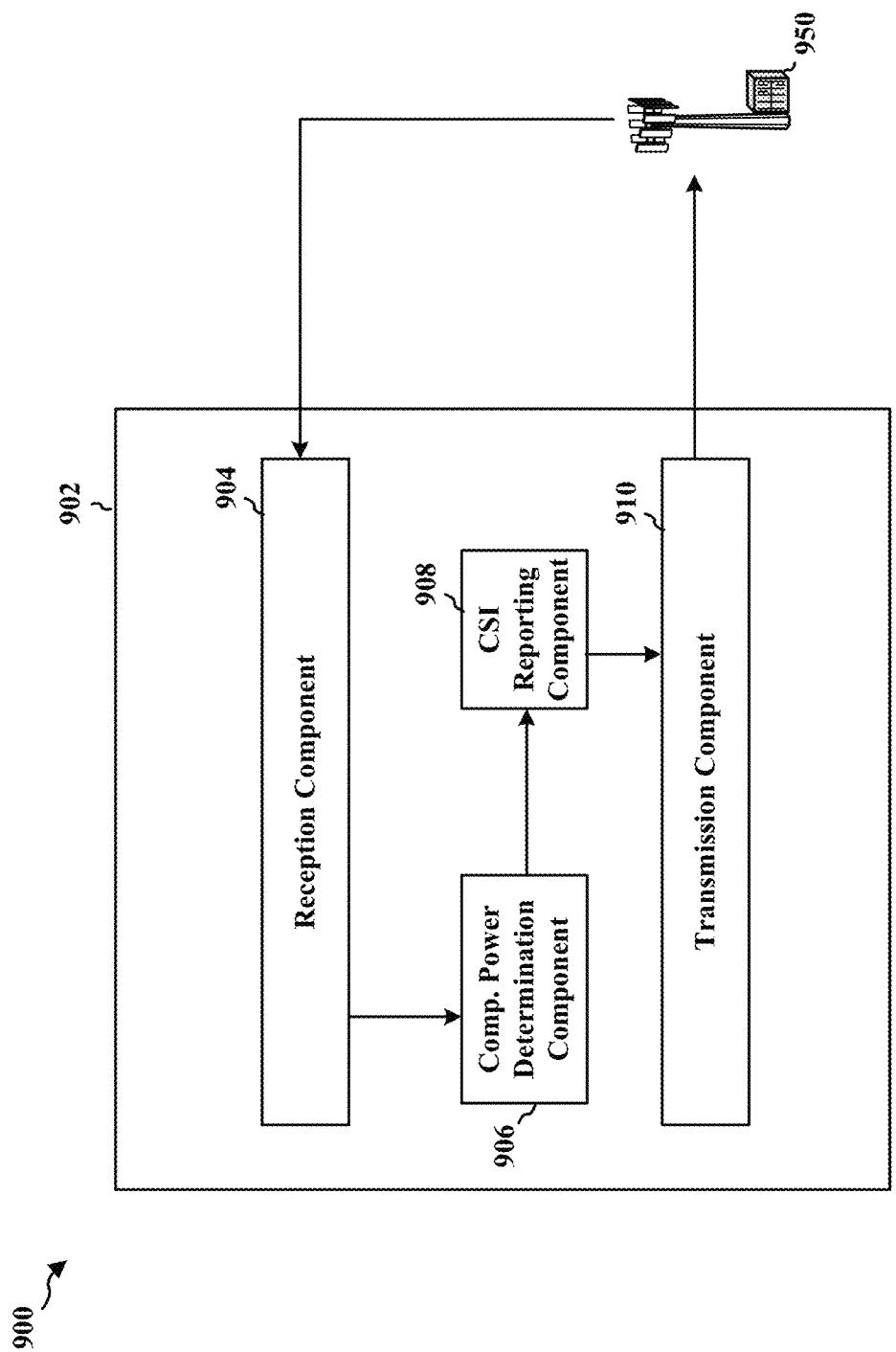
FIG. 9 is a conceptual data flow diagram illustrating the data flow between different components/means in an exemplary apparatus.

FIG. 9 is a conceptual data flow diagram 900 illustrating the data flow between different components/means in an exemplary apparatus 902. The apparatus 902 may be a UE. The apparatus 902 includes a reception component 904, a computing-power-determination component 906, a CSI reporting component 908, and a transmission component 910.

The reception component 904 monitors a respective DCCH from each of a plurality of TRPs. The CSI reporting component 908 receives, from a first TRP of the plurality of TRPs, a first trigger for reporting N1 channel state information (CSI) reports within a time duration. N1 is an integer greater than 0.

The computing-power-determination component 906 determines that P processing units are remaining available for calculation of CSI reports while the CSI reporting component 908 is calculating the N1 CSI reports. P is a number greater than or equal to zero. Each of the P processing units indicates a predetermined amount of computing power of the UE processing.

The computing-power-determination component 906 sends an indication associated with the P processing units to one or more of the plurality of TRPs. The indication may indicate that the P processing units are available at the UE. The indication may indicate that the N1 CSI reports that are committed to be updated.

The CSI reporting component 908 receives, from a second TRP of the plurality of TRPs, a second trigger for reporting M CSI reports within the time duration. M is an integer greater than 0. The computing-power-determination component 906 determines that the P processing units are not sufficient for calculating the N1 CSI reports and the M CSI reports concurrently. The CSI reporting component 908 determines that the N1 CSI reports have a priority level greater than a priority level of the M CSI reports. The CSI reporting component 908 commits to update the N1 CSI reports.

The CSI reporting component 908 selects N2 CSI reports from the M CSI reports such that the P processing units are sufficient for calculating the N2 CSI reports. N2 is an integer greater than 0 and no more than M. The CSI reporting component 908 calculates and updates the N1 CSI reports. The CSI reporting component 908 calculates and updating the N2 CSI reports. The CSI reporting component 908 prepares (M-N2) uncalculated CSI reports. The CSI reporting component 908 sends the N1 and the M CSI reports in an uplink channel.

In certain configurations, to prepare the M-N2 uncalculated CSI reports, the CSI reporting component 908 uses CSI reports calculated previously or dummy CSI reports. In certain configurations, each of the uncalculated (M−N2) CSI reports is represented by a predefined sequence. In certain configurations, the priority levels of the N1 CSI reports and the M CSI reports are determined based on indices identifying the first TRP and the second TRP, respectively. In certain configurations, the reception component 904 receives, from the first TRP, a first configuration identifier for generating a seed for deriving CSI-RS reference signals transmitted from the first TRP. The reception component 904 receives, from the second TRP, a second configuration identifier for generating a seed for CSI-RSs transmitted from the second TRP. The priority levels of the N1 CSI reports and the M CSI reports are determined based on the first configuration identifier and the second configuration identifier, respectively.

In certain configurations, the respective DCCH from the first TRP is monitored on a first CORESET in a particular slot and associated with a first CORESET identifier. The respective DCCH from the second TRP is monitored on a second CORESET in the particular slot and associated with a second CORESET identifier. The priority levels of the N1 CSI reports and the M CSI reports are determined based on the first CORESET identifier and the second CORESET identifier, respectively.

In certain configurations, the reception component 904/transmission component 910 communicates with the first TRP using a first RAT. The reception component 904/transmission component 910 communicates with the second TRP using a second RAT. In certain configurations, the first TRP and the second TRP are the same TRP.

Figure 10:
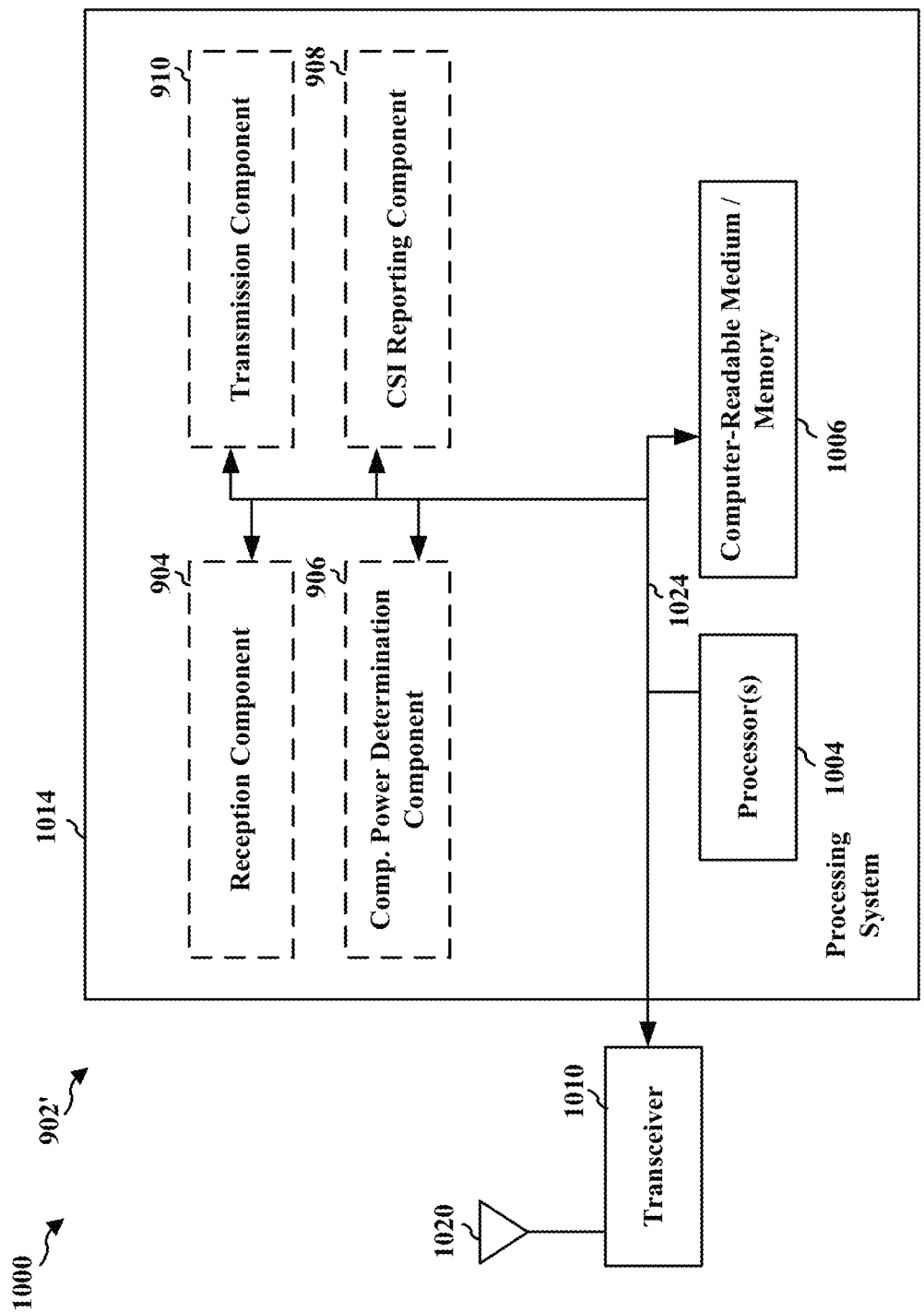
FIG. 10 is a diagram illustrating an example of a hardware implementation for an apparatus employing a processing system

FIG. 10 is a diagram 1000 illustrating an example of a hardware implementation for an apparatus 902' employing a processing system 1014. The apparatus 902' may be a UE. The processing system 1014 may be implemented with a bus architecture, represented generally by a bus 1024. The bus 1024 may include any number of interconnecting buses and bridges depending on the specific application of the processing system 1014 and the overall design constraints. The bus 1024 links together various circuits including one or more processors and/or hardware components, represented by one or more processors 1004, the reception component 904, the computing-power-determination component 906, the CSI reporting component 908, the transmission component 910, and a computer-readable medium/memory 1006. The bus 1024 may also link various other circuits such as timing sources, peripherals, voltage regulators, and power management circuits, etc.

The processing system 1014 may be coupled to a transceiver 1010, which may be one or more of the transceivers 254. The transceiver 1010 is coupled to one or more antennas 1020, which may be the communication antennas 252.

The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020.

The processing system 1014 includes one or more processors 1004 coupled to a computer-readable medium/memory 1006. The one or more processors 1004 are responsible for general processing, including the execution of software stored on the computer-readable medium/memory 1006. The software, when executed by the one or more processors 1004, causes the processing system 1014 to perform the various functions described supra for any particular apparatus. The computer-readable medium/memory 1006 may also be used for storing data that is manipulated by the one or more processors 1004 when executing software. The processing system 1014 further includes at least one of the reception component 904, the computing-power-determination component 906, the CSI reporting component 908, and the transmission component 910. The components may be software components running in the one or more processors 1004, resident/stored in the computer readable medium/memory 1006, one or more hardware components coupled to the one or more processors 1004, or some combination thereof. The processing system 1014 may be a component of the UE 250 and may include the memory 260 and/or at least one of the TX processor 268, the RX processor 256, and the communication processor 259.

In one configuration, the apparatus 902/apparatus 902' for wireless communication includes means for performing each of the operations of FIG. 8. The aforementioned means may be one or more of the aforementioned components of the apparatus 902 and/or the processing system 1014 of the apparatus 902' configured to perform the functions recited by the aforementioned means.

As described supra, the processing system 1014 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   monitoring a respective down link control channel (DCCH) from each of a plurality of transmission and reception points (TRPs);
   receiving, from a first TRP of the plurality of TRPs, a first trigger for reporting N1 channel state information (CSI) reports within a time duration, N1 being an integer greater than 0;
   committing to update the N1 CSI reports;
   determining that P processing units are remaining available for calculation of CSI reports while the UE is calculating the N1 CSI reports, P being a number greater than or equal to zero, each of the P processing units indicating a predetermined amount of computing power of the UE; and
   sending an indication associated with the P processing units to one or more of the plurality of TRPs, wherein the indication indicates that the N1 CSI reports are committed to be updated.

2. The method of claim 1, further comprising sending an indication associated with the P processing units to one or more of the plurality of TRPs, wherein the indication indicates that the P processing units are available at the UE.

3. The method of claim 1, further comprising sending the N1 CSI reports in an uplink channel.

4. The method of claim 3, wherein the indication is sent to the first TRP on the uplink channel.

5. The method of claim 1, further comprising:
   receiving, from a second TRP of the plurality of TRPs, a second trigger for reporting M CSI reports within the time duration, M being an integer greater than 0;
   determining that the P processing units are not sufficient for calculating the N1 CSI reports and the M CSI reports concurrently; and
   determining that the N1 CSI reports have a priority level greater than a priority level of the M CSI reports, wherein the N1 CSI reports are committed to be updated based on the priority levels of the N1 CSI reports and the M CSI reports.

6. The method of claim 5, further comprising:
   selecting N2 CSI reports from the M CSI reports such that the P processing units are sufficient for calculating the N2 CSI reports, N2 being an integer greater than 0 and no more than M;
   calculating and updating the N1 CSI reports;
   calculating and updating the N2 CSI reports; and
   preparing M-N2 uncalculated CSI reports.

7. The method of claim 6, wherein the preparing the M-N2 uncalculated CSI reports uses CSI reports calculated previously or dummy CSI reports.

8. The method of claim 6, wherein each of the uncalculated (M-N2) CSI reports is represented by a predefined sequence.

9. The method of claim 5, wherein the priority levels between the N1 CSI reports and the M CSI reports are determined based on indices identifying the first TRP and the second TRP, respectively.

10. The method of claim 5, further comprising:
    receiving, a first configuration identifier for generating a seed for deriving channel state information (CSI) reference signals associated with the first TRP; and
    receiving, a second configuration identifier for generating a seed for deriving channel state information (CSI) reference signals associated with the second TRP, wherein the priority levels of the N1 CSI reports and the M CSI reports are determined based on the first configuration identifier and the second configuration identifier, respectively.

11. The method of claim 5, wherein the respective DCCH from the first TRP is monitored on a first control resource set (CORESET) in a particular slot and associated with a first CORESET identifier, wherein the respective DCCH from the second TRP is monitored on a second control resource set (CORESET) in the particular slot and associated with a second CORESET identifier, wherein the priority levels of the N1 CSI reports and the M CSI reports are determined based on the first CORESET identifier and the second CORESET identifier, respectively.

12. The method of claim 5, wherein the UE communicates with the first TRP using a first radio access technology (RAT), wherein the UE communicates with the second TRP using a second RAT.

13. The method of claim 12, wherein the first TRP and the second TRP are a same TRP.

14. An apparatus for wireless communication, the apparatus being a user equipment (UE), comprising:
    a memory; and
    at least one processor coupled to the memory and configured to:
       monitor a respective down link control channel (DCCH) from each of a plurality of transmission and reception points (TRPs);
       receive, from a first TRP of the plurality of TRPs, a first trigger for reporting N1 channel state information (CSI) reports within a time duration, N1 being an integer greater than 0;
       commit to update the N1 CSI reports;
       determine that P processing units are remaining available for calculation of CSI reports while the UE is calculating the N1 CSI reports, P being a number greater than or equal to zero, each of the P processing units indicating a predetermined amount of computing power of the UE; and
       send an indication associated with the P processing units to one or more of the plurality of TRPs, wherein the indication indicates that the N1 CSI reports are committed to be updated.

15. The apparatus of claim 14, wherein the at least one processor is further configured to send an indication associated with the P processing units to one or more of the plurality of TRPs, wherein the indication indicates that the P processing units are available at the UE.

16. The apparatus of claim 14, wherein the at least one processor is further configured to send the N1 CSI reports in an uplink channel.

17. The apparatus of claim 16, wherein the indication is sent to the first TRP on the uplink channel.

18. A non-transitory computer-readable medium storing computer executable code for wireless communication of a user equipment (UE), comprising code to:
- monitor a respective down link control channel (DCCH) from each of a plurality of transmission and reception points (TRPs);
- receive, from a first TRP of the plurality of TRPs, a first trigger for reporting N1 channel state information (CSI) reports within a time duration, N1 being an integer greater than 0;
- commit to update the N1 CSI reports;
- determine that P processing units are remaining available for calculation of CSI reports while the UE is calculating the N1 CSI reports, P being a number greater than or equal to zero, each of the P processing units indicating a predetermined amount of computing power of the UE; and
- send an indication associated with the P processing units to one or more of the plurality of TRPs, wherein the indication indicates that the N1 CSI reports are committed to be updated.

\* \* \* \* \*